(12) United States Patent
Voigtlander (10) Patent No.: US 9,531,265 B1
(45) Date of Patent: Dec. 27, 2016

(54) CAPACITIVE CURRENT-MODE CONTROL OF A DC/DC CONVERTER

(71) Applicant: Google Inc., Mountain View, CA (US)

(72) Inventor: Paul Voigtlander, Hayward, CA (US)

(73) Assignee: Google Inc., Mountain View, CA (US)

( * ) Notice: Subject to any disclaimer, the term of this patent is extended or adjusted under 35 U.S.C. 154(b) by 367 days.

(21) Appl. No.: 14/243,065

(22) Filed: Apr. 2, 2014

Related U.S. Application Data (63) Continuation of application No. 13/783,509, filed on Mar. 4, 2013, now Pat. No. 8,736,244.

(51) Int. Cl.
*H02M 3/156* (2006.01)
*H02M 1/00* (2006.01)

(52) U.S. Cl.
CPC ..... *H02M 3/156* (2013.01); *H02M 2001/0009* (2013.01); *H02M 2001/0019* (2013.01)

(58) Field of Classification Search
CPC ............. H02M 3/126; H02M 2001/0009; H02M 2001/0016; H02M 2001/0019; H02M 2001/0025; H02M 3/156; H02M 3/158
See application file for complete search history.

(56) References Cited

U.S. PATENT DOCUMENTS

| | | | |
|---|---|---|---|
| 6,249,447 B1 | 6/2001 | Boylan et al. | |
| 6,828,762 B2 * | 12/2004 | Brkovic | H02M 3/28 323/222 |
| 7,023,184 B2 | 4/2006 | Kiep | |
| 7,642,762 B2 * | 1/2010 | Xie | H02M 3/156 315/224 |
| 7,796,365 B2 * | 9/2010 | Isham | H02H 7/1227 361/18 |
| 7,898,825 B2 | 3/2011 | Mulligan et al. | |
| 8,138,732 B2 * | 3/2012 | Tseng | H02M 3/156 323/282 |
| 8,159,203 B2 | 4/2012 | Derksen | |
| 8,350,551 B2 * | 1/2013 | Weng | H02M 3/1588 323/224 |
| 8,482,271 B2 | 7/2013 | Prodic et al. | |
| 2006/0091869 A1 * | 5/2006 | Zhang | H02M 3/156 323/282 |
| 2009/0322300 A1 | 12/2009 | Melanson et al. | |
| 2011/0227547 A1 * | 9/2011 | Wong | H02M 3/156 323/282 |
| 2012/0019224 A1 | 1/2012 | Lima et al. | |

* cited by examiner

*Primary Examiner* — Jessica Han
(74) *Attorney, Agent, or Firm* — Lerner, David, Littenberg, Krumholz & Mentlik, LLP (57) ABSTRACT

Systems and methods for implementing capacitive current-mode control of a voltage regulator or converter, such as a DC/DC buck converter, are provided. An inductor current flowing from an inductive element into a first node of the converter, and, an output current flowing from the first node into an external load coupled to the converter may be determined. The measured output current may be subtracted from the measured inductor current to indirectly determine a capacitor current flowing from the first node into a capacitive element coupled between the first node and ground. The inductor current may then be adjusted based on the indirect measure of the capacitor current. The output current provided to the external load by the converter may be current-limited. The inductor current and the output current may be determined by sensing one or more voltage differentials across discrete or parasitic resistances.

19 Claims, 7 Drawing Sheets

CAPACITIVE CURRENT-MODE CONTROL OF A DC/DC CONVERTER

CROSS-REFERENCE TO RELATED APPLICATIONS

The present application is a continuation of U.S. patent application Ser. No. 13/783,509, filed Mar. 4, 2013, the disclosure of which is incorporated herein by reference.

BACKGROUND

Power regulation and conversion are important features that are employed in a variety of systems for many different applications. One such application is in a power converter for a computing system. In such a system, a buck DC/DC converter may be used to provide a stepped-down or regulated DC voltage to various components in the system, including the system processor(s).

A DC/DC converter such as the buck DC/DC converter typically includes an inductive element (e.g., an inductor), a semiconductor switch (e.g., a transistor), and a capacitive element (e.g., a capacitor). The transistor is periodically driven on and off in a duty cycle to provide a regulated flow of current through the inductor which charges the capacitor to a desired voltage. The charge of the capacitor may thus be adjusted/maintained to provide a regulated voltage to external load coupled to an output of the converter.

SUMMARY OF THE INVENTION

One aspect of the disclosure provides a method for controlling an operation of a DC/DC converter. The method includes determining a measure of an inductor current flowing through an inductive element into a first node of the DC/DC converter. The method includes determining a measure of an output current flowing from the first node of the converter into an external load coupled to an output of the converter. The measure of the output current is subtracted from the measure of the inductor current to determine a measure of a capacitor current flowing from the first node of the converter into a capacitive element coupled between the first node and ground. The method also includes adjusting the inductor current flowing through the inductive element into the first node of the converter based on the measure of the capacitor current flowing from the first node into the capacitive element.

In one implementation, the method further includes adjusting the inductor current flowing through the inductive element based on a voltage difference between a reference voltage and an output voltage supplied by the converter to the external load. In another implementation, the method further includes current-limiting the output current flowing from the first node of the converter into the external load coupled to the output of the converter by AC coupling the output current. In yet another implementation, the method further includes sensing a first voltage differential to determine the measure of the inductor current flowing through the inductive element into the first node of the converter. In this aspect, the method further includes sensing a second voltage differential to determine the measure of the output current flowing from the first node of the converter into the external load coupled to the output of the converter.

Another aspect of the disclosure provides a current-mode DC/DC converter that includes a first differential amplifier for providing a first output indicating a measure of an inductor current flowing through an inductive element into a first node of the converter. The DC/DC converter includes a second differential amplifier for providing a second output indicating a measure of an output current flowing from the first node of the converter into an external load coupled to an output of the converter. In addition, the DC/DC converter includes a third differential amplifier having differential inputs for receiving the first output from the first differential amplifier and the second output from the second differential amplifier. The third differential amplifier can be configured to provide a third output. In this regard, the third output represents a difference between the first output and the second output. A measure of a capacitor current flowing from the first node of the converter into a capacitive element is coupled between the first node and ground.

DETAILED DESCRIPTION

Aspects, features and advantages of the present disclosure will be appreciated when considered with reference to the following description of preferred embodiments and accompanying figures. The same reference numbers in different drawings may identify the same or similar elements. Furthermore, the following description does not limit the present disclosure; rather, the scope of the disclosure is defined by the appended claims and equivalents.

Figure 1:
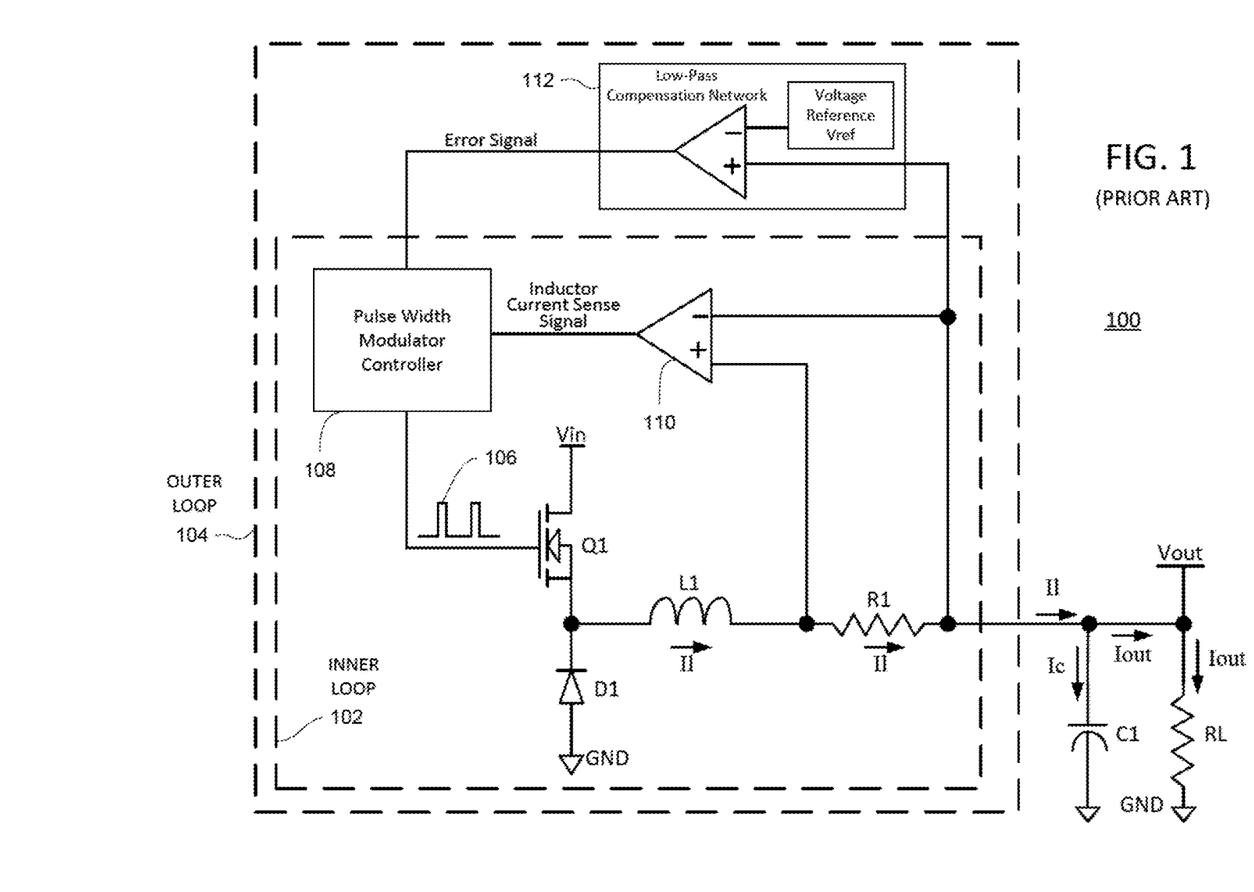
FIG. 1 illustrates a functional diagram DC/DC regulator/converter employing a conventional inductor current-mode control scheme.

FIG. 1 illustrates a simplified example of a conventional buck DC/DC converter 100 with inductor current-mode control, which includes a series transistor Q1, an inductor L1, a free-wheeling element D1 (typically a transistor), and a capacitor C1. In this example, the capacitor C1 is shown connected in parallel with an external load RL. In FIG. 1, the free-wheeling element D1 is shown figuratively as a diode, but it can also be a transistor with its gate controlled by pulse width modulator ("PWM") controller 108. For ease of illustration, certain lines in the buck converter 100 are shown as crossing. However, only intersecting lines attached by a node indicator (e.g., illustrated as a circular intersection point) are electrically coupled to one another.

The control scheme for the converter 100 uses two control loops which are referenced herein as the inner loop 102 and the outer loop 104. The inner loop 102, also called the current loop, controls the current IL flowing through the inductor L1 that charges the capacitor C1 to a desired constant voltage Vout to be provided to the external load RL. The outer loop 104, also called the voltage loop, further adjusts the inductor current IL based on changes in the output voltage Vout across the external load RL.

The inner loop 102 controls the duty cycle of a signal 106 provided to the gate of the transistor Q1. The duty cycle of the signal 106 is controlled by the PWM controller 108 on a cycle-by-cycle basis to maintain a controlled current IL, which flows through the inductor L1 via the emitter of the transistor Q1 and charges the capacitor C1 to the desired constant voltage Vout to be provided to the external load RL. A discrete resistor R1 is provided in series with the inductor L1.

As the current IL flows through both the inductor IL and the resistor R1, the voltage drop across the resistor R1 is used to measure of the current IL flowing through the inductor L1. Thus, the voltage drop across R1 is provided as a differential input to a differential amplifier 110, which, in turn, provides an output signal which represents the measure of the current IL flowing through the inductor L1. The PWM controller 108 receives the output signal as a measure of the inductor current IL from the differential amplifier 110 and adjusts the duty cycle of the signal 106 which switches or drives the transistor Q1 on and off to increase, decrease, or maintain the current IL flowing through the inductor L1. While the differential amplifier 110 is illustrated separately for explanation purposes, it may be also incorporated into the PWM controller 108 in some aspects.

The outer loop 104 is used to compensate for changes in the output voltage Vout supplied to the load RL. In particular, a low-pass compensation network 112 provided in the outer loop 104 compares the output voltage Vout to a reference voltage Vref. In some examples, the low-pass compensation network 112 can include a type of divider network (not shown) that divides down the output voltage Vout before it is compared to the reference voltage Vref. The difference between the output voltage Vout and the reference voltage Vref is provided from the low-pass compensation network 112 as an error signal to the PWM controller 108. The PWM controller 108 further adjusts (e.g., increases or decreases) the inductor current IL in proportion to the error signal by changing the duty cycle of the signal 106.

The low-pass compensation network 112 is used to control the transfer function of the outer loop 104 to maintain overall stability of the converter 100. To maintain stability, the bandwidth of the outer loop 104 is limited to some fraction of the operating frequency of the converter 100. This bandwidth limit in the outer loop 104 sets an upper limit on the converter's transient response, which represents the speed which the converter 100 can respond to the changes in the output voltage Vout, which are caused by the demand from the external load RL. For this reason, the outer loop 104 is also sometimes referred to as the "slow" loop. In contrast, the inner loop 102 is referred to as the "fast" loop, as it is able to vary the duty cycle of the signal 106 on a cycle-by-cycle basis. As a result of the limitations imposed by the outer loop, the converter 100 of FIG. 1 is characterized as having a relatively slow transient response time.

Figure 2:
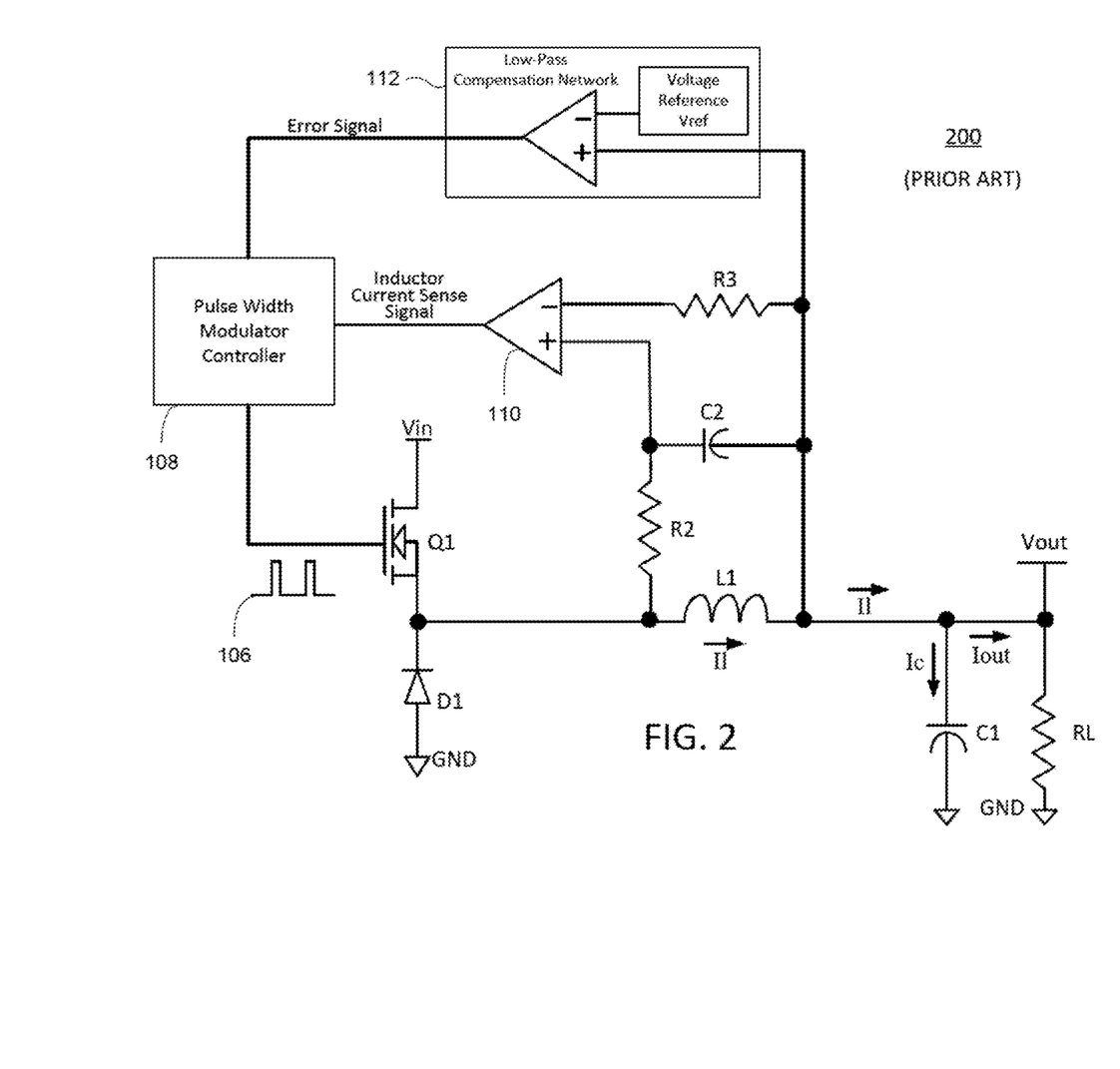
FIG. 2 illustrates a functional diagram DC/DC regulator/converter that includes a ESR sense circuit while employing a conventional inductor current-mode control scheme.

The performance of the converter 100 shown in FIG. 1 can be somewhat improved by omitting the discrete resistor R1 that is connected in series with the inductor L1. In this modified converter, the equivalent series resistance ("ESR") of inductor L1 can be sensed and used to directly measure the current IL flowing through the inductor, rather than using the voltage drop across the resistor R1 to measure the current IL. FIG. 2 illustrates an example of a modified DC/DC buck converter 200 that does not include the discrete resistor R1.

Converter 200 shown in FIG. 2 is similar to the converter 100 of FIG. 1, except that the discrete resistor R1 of FIG. 1 is replaced with an ESR sense circuit formed by the resistors R2, R3 and the capacitor C1. The output of the ESR sense circuit is provided as a differential input to the differential amplifier 110, which, in turn, provides an output signal to the PWM controller 108 as the measure of the current IL flowing through the inductor L1 based on the differential voltage drop across the ESR of the inductor. Even though converter 200 has additional discrete components, namely resistors R2, R3 and capacitor C1 that form the ESR sense circuit, the converter 200 improves performance by eliminating the losses in the omitted discrete R1.

Figure 3:
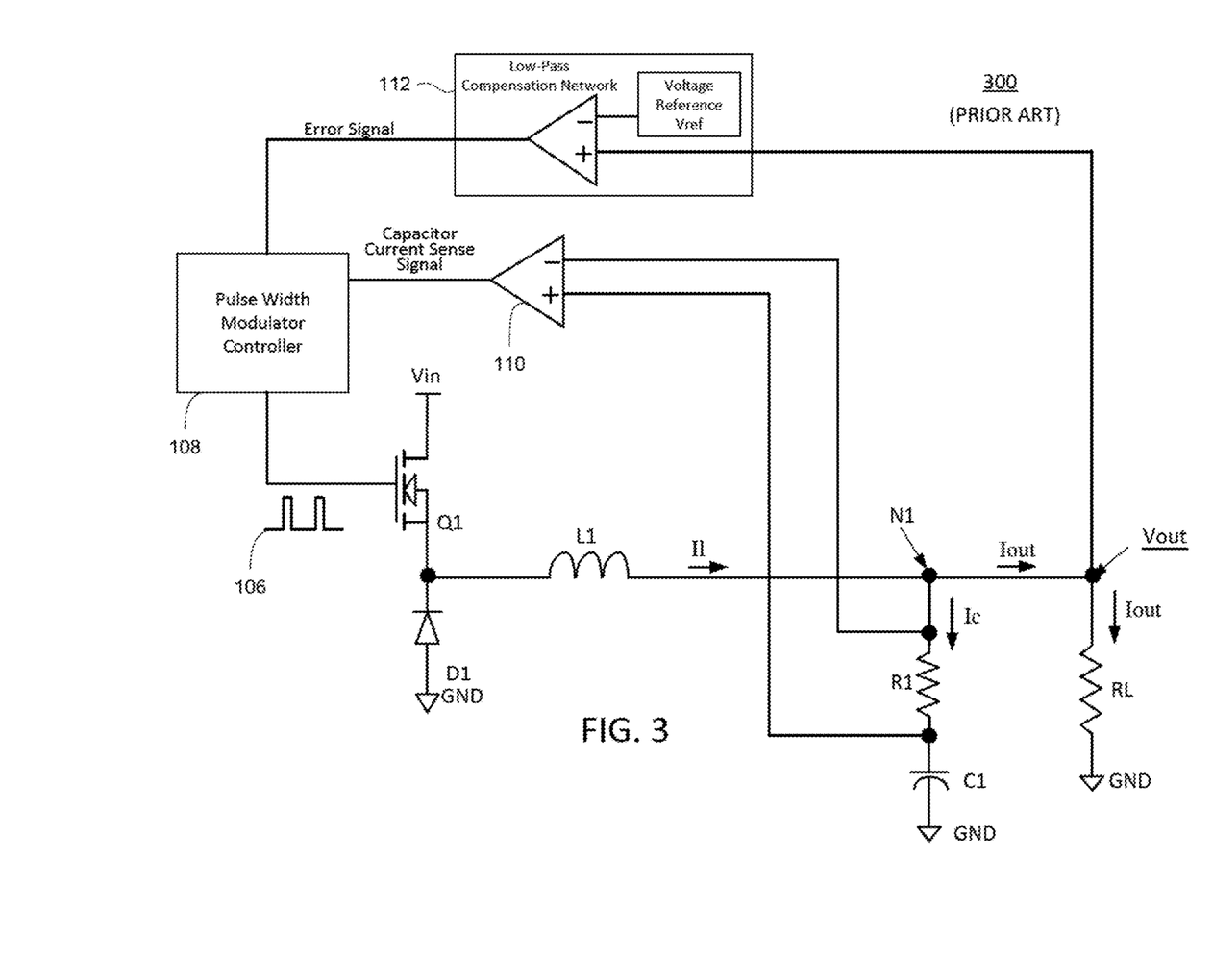
FIG. 3 illustrates a functional diagram DC/DC regulator/converter employing a direct capacitor current-mode control scheme.

FIG. 3 illustrates another example of a DC/DC buck converter. Converter 300 shown in FIG. 3 is similar to the converter 100 of FIG. 1, except that the resistor R1 is now in series with capacitor C1 instead of in series with inductor L1. As before, the voltage drop across the resistor R1 is provided as a differential input to the differential amplifier 110. However, since the resistor R1 is now in series with capacitor C1, the output signal provided by the differential amplifier 110 now measures the current IC which flows through both the output capacitor C1 and the resistor R1. As a result, the operation of converter 300 is similar to the operation of converter 100, except that the duty cycle of the transistor Q1 is adjusted by the controller 108 to increase, decrease or maintain the inductor current IL based on changes measured in the current IC flowing through capacitor C1, given that the capacitor current IC can be understood as being equal to the output load current Iout minus the inductor current IL (IC=IL−Iout) as the current divides at the node N1. For this reason, converter 300 may be understood as using a capacitor current-mode control scheme instead of the classical inductor current-mode control scheme.

Furthermore, since the current IC flowing through the capacitor C1 is equal to IL−Iout, the capacitor current IC reflects changes in both the current IL flowing through the inductor L1 and the current Iout flowing through the external load RL. Thus, the output signal provided by the differential amplifier 110 to the PWM controller 108 not only reflects changes in the inductor current IL, but also reflects changes in the output current Iout. Since the output signal is fed back to the PWM controller 108 via the fast loop, converter 300 has a much faster transient response time than converter 100 and converter 200 of FIGS. 1 and 2 respectively. However, while the improvements in the transient response of the converter 300 due to the capacitor current-mode control scheme are desirable, directly measuring the current IC flowing through the capacitor C1 may not be ideal. First, measuring the current IC by connecting a discrete resistor R1 in series with the capacitor C1 as shown in FIG. 3 degrades the performance of the converter 300. Second, while the performance of converter 300 may be somewhat improved by omitting the resistor R1 and by directly measuring the capacitor current IC using the parasitic ESR of the capacitor C1, this approach may also not be practical because the parasitic ESR of the capacitor C1 may be too small to be used effectively.

Figure 4:
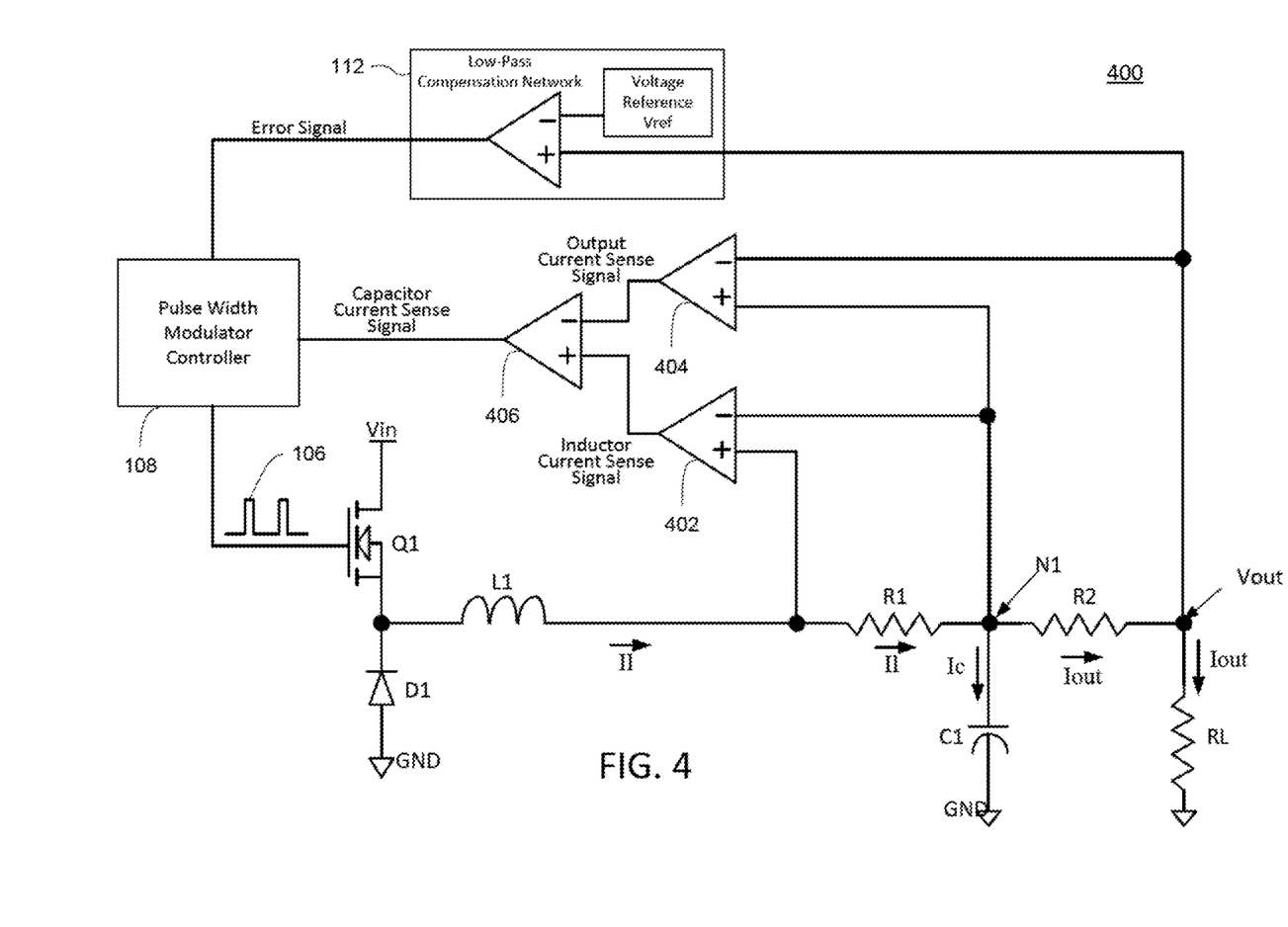
FIG. 4 illustrates one example of a DC/DC regulator/converter employing an indirect capacitor current-mode control scheme in accordance with an aspect of the disclosure.

FIG. 4 illustrates another embodiment of a DC/DC buck converter 400 in accordance with an aspect of the disclosure, which has the advantage of having a faster transient response time than converter 100 and converter 200 without incurring the disadvantages of converter 300 described above. Converter 400 of FIG. 4 differs from converter 300 of FIG. 3 in that, in converter 400, the current IC flowing through the capacitor C1 is measured indirectly as now described below, rather than directly as in converter 300.

As seen in FIG. 4, converter 400 includes a discrete resistor R1 that is connected in series between the inductor L1 and node N1 of the converter. The voltage drop across resistor R1 is provided as a differential input to the differential amplifier 402, which provides an output inductor current sense signal that reflects the inductor current IL which flows thorough both the inductor L1 and the resistor R1 into node N1. Converter 400 further includes a discrete resistor R2 that is connected in series between node N1 and the external load RL. The voltage drop across the resistor R2 is provided as a differential input to the differential amplifier 404, which provides an output current sense signal that reflects the output current Iout which flows from node N1 into both the resistor R2 and the external load RL. The output inductor current sense signal representing the current IL and output current sense signal representing the current Iout are provided as differential inputs to the differential amplifier 406, which subtracts the two signals to provide an output capacitor current sense signal representing the current IC flowing from node N1 into the capacitor C1, since the capacitor current IC may be understood to be equal to the inductor current IL minus the output current Iout (i.e., IC=Iout−IL) as the current divides at node N1. Thus, resistors R1 and R2, in conjunction with the differential amplifiers 402, 404, and 406, may be used to indirectly determine the current IC flowing through the capacitor C1 without having to directly measure the capacitor current based on, for example, a discrete resistor connected in series with the capacitor C1, the parasitic ESR of capacitor C1, or other means configured to directly measure the capacitor current.

Since the indirectly determined output capacitor current signal is fed back into the PWM controller 108 via the fast loop, converter 400 has the advantage of having a much faster transient response time than converter 100 and converter 200 of FIGS. 1 and 2 respectively, without incurring the disadvantages resulting from the direct measurement of the capacitor current as in converter 300 of FIG. 3.

Converter 400 of FIG. 4 can be modified in different ways. For example, one feature of the conventional inductor current-mode control scheme of converters 100 and 200 described above is the inherent ability to limit the output current flowing through the external load. This is because the measured inductor current IL can be considered as an approximate and adequate proxy of the output current Iout flowing through the load RL. In one example, the output current limit can be achieved by comparing the measured inductor current IL against a predefined current limiting threshold and limiting its duty-cycle so as to not allow the measured inductor current IL to rise above this threshold level.

Figure 5:
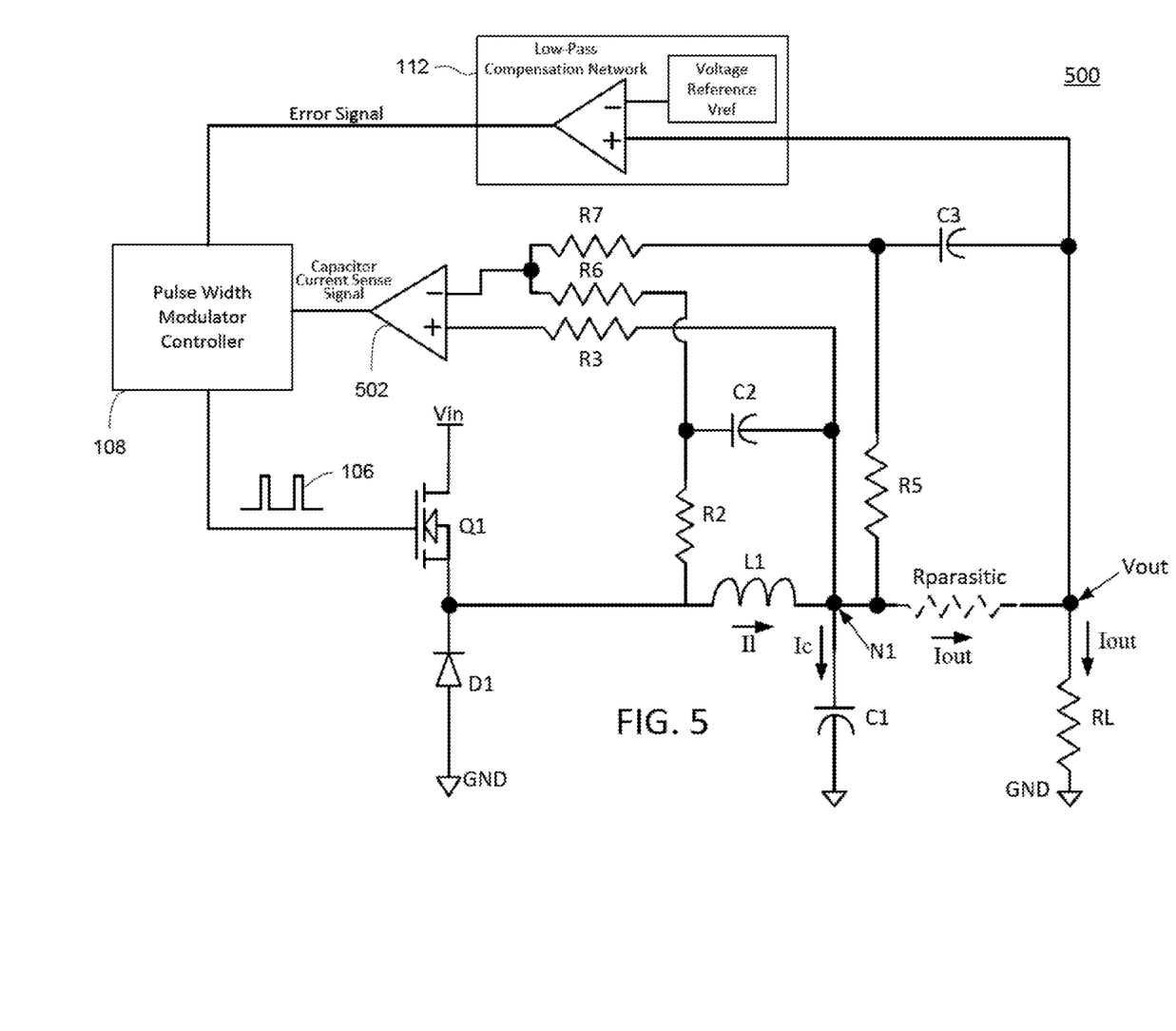
FIG. 5 illustrates another example of a DC/DC regulator/converter employing an indirect capacitor current-mode control scheme in accordance with various aspects of the disclosure.

Converter 500 of FIG. 5 illustrates one example of an alternate implementation which includes several differences over converter 400 of FIG. 4. As shown in FIG. 5, converter 500 differs from converter 400 in that, in converter 500, the output current flowing from node N1 into the external load RL is AC coupled via capacitor C3 to limit the current Iout flowing through the external load RL. The capacitor C3 is used to AC couple the output current signal into a current-loop. AC coupling may be used rather than DC coupling so the current limiting threshold described above can be employed. For example, if the signal is DC coupled, it may partially or completely cancel the DC portion of the signal coming from the inductor L1.

Differential amplifier 502 and resistors R3, R6, R7 form a differential amplifier that amplifies the difference between two current signals. For example, if Node Q1, D1 is represented by variable N1, Node C2,R2 is represented by variable N2 and Node C3,R5 is represented as N3, the signals at Node N2 and N3 are summed and the subtracted from the signal at Node N1. In this example, C3 and R5 for a high-pass filter to AC couple the output current signal to the differential amplifier, and C2 and R2 form a low pass filter to create the inductor current signal. The magnitudes of signals at N2 and N3 may not be the same. As such, the values of resistors R3, R6, R7 may be chosen to create a proper subtraction of the inductor current and output current signals.

Furthermore, converter 500 does not include a discrete resistor connected in series between the inductor L1 the node N1 as in converter 400, and instead includes an ESR sense circuit (formed by resistor R2, resistor R3, resistor R6 and capacitor C2) for determining the current IL flowing through the inductor L1 based on the discrete series resistance of the inductor. Yet further, converter 500 also includes a parasitic ESR sense circuit for measuring the current Iout flowing from node N1 into the external load RL without using a discrete resistor connected in series between node N1 and the external load RL as in converter 400. The parasitic ESR sense circuit is formed by a discrete resistor R5, a discrete resistor R7 and capacitor C3, which measure the parasitic voltage drop across a length of trace (indicated using in FIG. 5), which is caused by the parasitic series resistance of the trace itself (referenced as Rparasitic). Capacitor C2 and resistor R2 create a signal which can serve as a proxy for current flowing through the parasitic ESR of the inductor L1. The inductor L1 along with the ESR form a type of low-pass filter where input to the filer is from Nodes Q1, D1, L1, R2 and N1 and output is across the ESR. R2 and C2 may form a similar low-pass filter across the same Nodes Q1, D1, L1, R2 and N1. The values of R2 and C2 are chosen to provide the same cross-over frequency as the filter formed by inductor L1 and the ESR. As long as the cross-over frequency is matched, the low-pass filter formed by R2 and C2 will provide a reasonable approximation of the voltage across the ESR of the inductor L1.

As before, the measured IL current and the measured Iout current may be respectively provided as differential inputs to the differential amplifier 502, which produces an output capacitor current sense signal representing the capacitor current IC flowing from node N1 into the capacitor C1 by subtracting the output current Iout from the inductor current IL.

Figure 6:
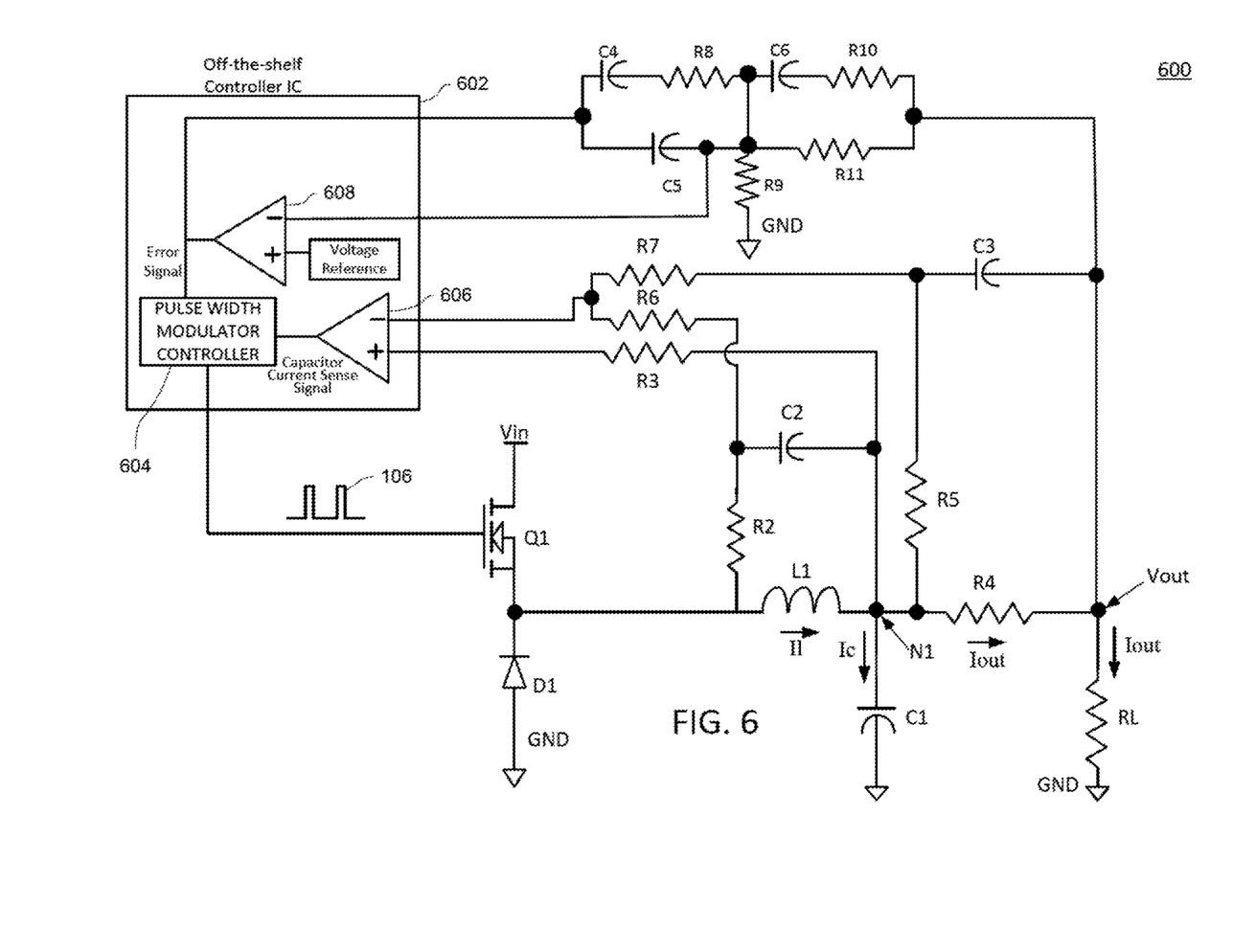
FIG. 6 illustrates an example implementation of the DC/DC regulator/converter shown in FIG. 5 using off-the-shelf components.

Yet another example of a DC-DC converter 600 is illustrated in FIG. 6. The operation of converter 600 is the generally same as that of converter 500 of FIG. 5, except that converter 600 is implemented using an off-the-shelf integrated chip ("IC") controller 602 such as a LTC3854 controller by Linear Technology. Controller 602 may be configured to adjust the duty cycle of the output signal 106 in order to maintain a desired current IL flowing through the inductor L1 via the semiconductor switch Q1. More particularly, controller 602 may be configured to vary the duty cycle of the signal 106 via pulse width modulator 604 based on the indirectly measured capacitor current sense signal and an error signal which are received via differential amplifiers 606, 608 of the controller 602. Furthermore, converter 600 may also include a low-pass compensation network formed by resistors R8-R11 and capacitors C4-C6 as shown in FIG. 6. This low pass compensation network may be used to control the overall transfer function and maintain stability of the converter 600, while the transient response time of the converter 600 may be improved by using a capacitor current-mode control scheme as described above with reference to FIG. 5.

Figure 7:
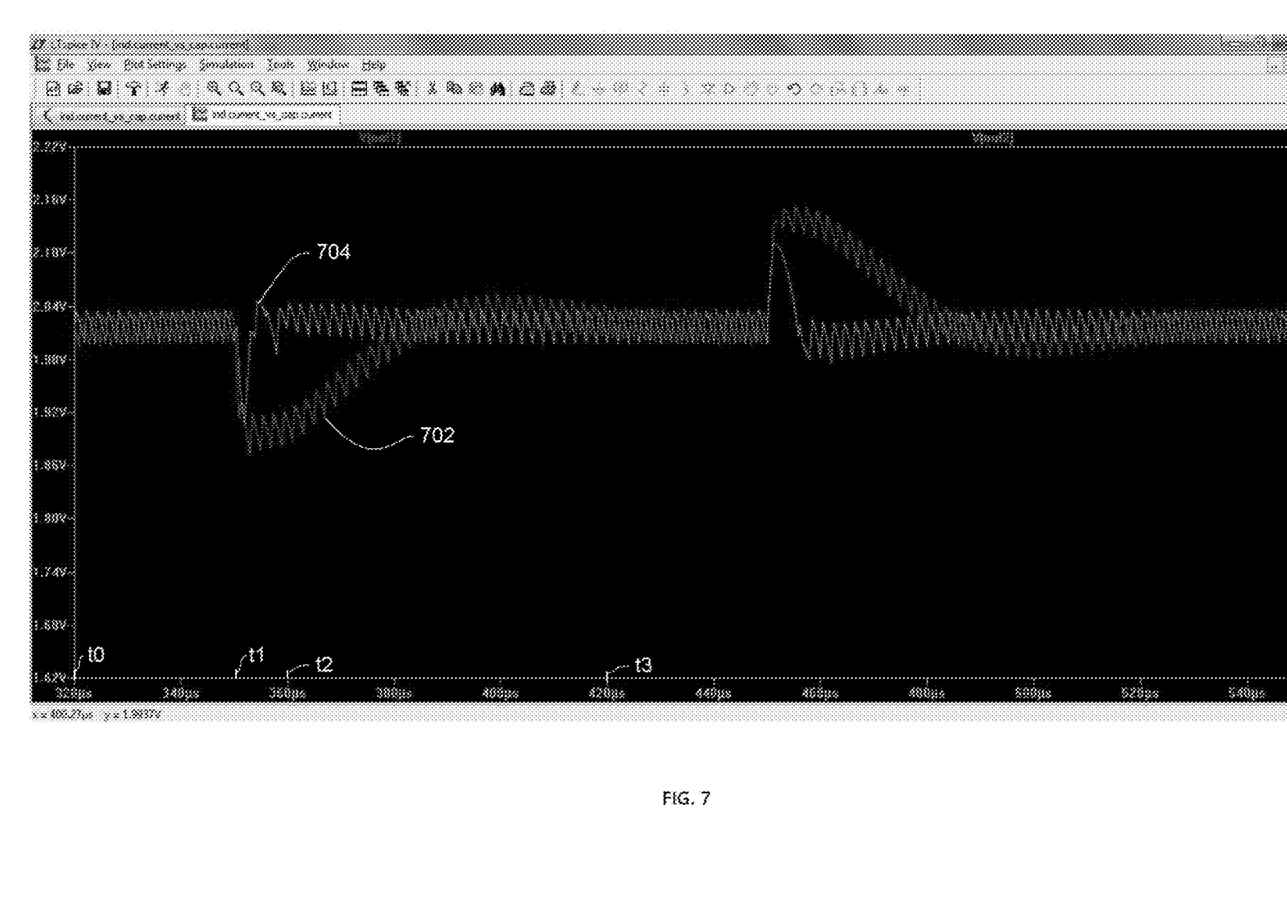
FIG. 7 compares transient response times of buck DC-DC converter systems.

FIG. 7 shows an example comparing the output voltage response 702 of a typical conventional inductor current-mode control scheme DC-DC converter such as the one shown of FIG. 2 with the improved output voltage response 704 resulting from the indirect capacitor current-mode control scheme DC-DC converter described in accordance with FIGS. 5 and 6 of the disclosure above.

As shown in this example, conventional output response 702 and the improved output response 704 each depict a similar steady state response of about 2 volts (e.g., from time t0 to t1) that may be provided to an external load. The steady state output may also include small or insignificant variations or oscillations (e.g., about 200 mvs) above and below the steady state value during normal or steady state operation.

Conventional output response 702 further depicts a transient response starting approximately at time t1 (350 microseconds) and ending approximately at time t3 (420 microseconds), at which time the conventional output response 702 may be considered as having re-achieved or substantially re-achieved the steady state value of about 2 volts. Such transient response may be caused, for example, by a relatively sudden change (e.g., increase or decrease) in current demand from the external load. As seen in this simulated example, the duration of the transient response time for the inductor current-mode control scheme DC-DC converter to a particular change in demand from an external load is about 70 microseconds (420 microseconds-350 microseconds).

In contrast, the transient response time of the indirect capacitor current-mode control scheme DC-DC converter to the same change in the demand from a similar or same the external load is much faster, also starting approximately at time t1 (350 microseconds) and ending approximately at time t2 (360 microseconds) for a total duration of about 10 microseconds as depicted in the improved output response 704. Thus, in the simulated example depicted in FIG. 7, the transient response time of the indirect capacitor current-mode control scheme DC-DC converter can be seen to be as much as 7 times better when compared to the transient response time of a typical conventional inductor current-mode control scheme DC-DC converter.

While certain components have been illustrated in the various aspects described above, the disclosure is not limited to any particular component or type of component. For example, the differential amplifiers illustrated in the figures above may be any suitable device or circuit having high-impedance inputs and a low-impedance output such that the inductor current IL flowing into node N1 may be equal to or acceptably close to being equal to the sum of the currents flowing out of node N1 and into the external load RL and the capacitor C1, respectively. As another example, transistor Q1 may be a MOSFET, JFET, or other type of known semiconductor device configured to provide and vary a current to the inductor L1 based on, for example, the duty cycle of a signal received as an input. Similarly, the functionality of controller 108 described above may be implemented in hardware, software, or a combination thereof. For example, in one aspect the controller 108 may be implemented using a general purpose microprocessor, which may be suitably configured using hardware or software in accordance with one or more aspects of the disclosure.

Although the disclosure herein has been described with reference to particular embodiments, it is to be understood that these embodiments are merely illustrative of the principles and applications of the present disclosure. It is therefore to be understood that numerous modifications may be made to the illustrative embodiments and that other arrangements may be devised without departing from the spirit and scope of the present disclosure as defined by the appended claims. Furthermore, while particular operations are described in a specific order in the appended drawings, such operations are not limited to any particular order unless such order is expressly set forth herein.

The invention claimed is:

1. A method, comprising:
   identifying a measure of an inductor current flowing into a first node of a converter, the first node being attached to an inductive element;
   determining a difference amount between the measure of the inductor current and a measure of an output current flowing from the first node to an external load, the external load being attached to an output of the converter, wherein the difference amount indicates a measure of capacitor current flowing from the first node of the converter into a capacitive element coupled between the first node and ground; and
   adjusting the inductor current flowing into the first node of the converter based on the difference amount.

2. The method of claim 1, wherein the inductor current flows through the inductive element into the first node of the converter.

3. The method of claim 2, wherein determining the difference amount comprises determining a difference between the output current and the inductor current as the capacitor current divides at the first node.

4. The method of claim 1, further comprising:
   further adjusting the inductor current flowing through the inductive element based on a voltage difference between a reference voltage and an output voltage supplied by the converter to the external load.

5. The method of claim 1, further comprising:
   current-limiting the output current flowing from the first node of the converter into the external load coupled to the output of the converter by AC coupling the output current.

6. The method of claim 5, further comprising:
   sensing a first voltage differential to determine the measure of the inductor current flowing through the inductive element into the first node of the converter.

7. The method of claim 6, further comprising:
   sensing a second voltage differential to determine the measure of the output current flowing from the first node of the converter into the external load coupled to the output of the converter.

8. A current-mode DC/DC converter comprising:
   a first resistor connected to a first node of the convertor, the first resistor configured to provide a first input indicating an amount of voltage drop associated with inductor current flowing into the first node;
   a second resistor connected to the first node and an external load, the second resistor configured to provide a second input indicting a measure of output current flowing from the first node into the external load; and
   a differential amplifier coupled to the first node and configured to provide an output indicating a difference between the first input and the second input as a measure of a current flowing from the first node of the converter into a capacitive element coupled between the first node and ground.

9. The current-mode DC/DC converter of claim 8, further comprising:
a controller configured to receive the output and to adjust the current flowing through the first node of the converter based on the measure of the current flowing from the first node into the capacitive element.

10. The current-mode DC/DC converter of claim 9, wherein the controller is further configured to:
adjust the inductor current flowing through the inductive element based on a voltage difference between a reference voltage and an output voltage supplied by the converter to the external load.

11. The current-mode DC/DC converter of claim 10, further comprising:
a low-pass circuit network coupled between the output of the converter and controller, the low-pass circuit network being configured to filter and determine the voltage difference between the reference voltage and the output voltage supplied by the converter to the external load.

12. The current mode DC/DC converter of claim 11, wherein the circuit is further configured to determine the measure of the output current flowing from the first node of the converter into the external load coupled to the output of the converter by detecting, as a differential input, a voltage drop across a parasitic equivalent series resistance coupled in series between the first node and the external load.

13. The current-mode DC/DC converter of claim 11, wherein the circuit is further configured to determine the measure of the inductor current flowing through the inductive element into the first node of the converter by determining a voltage differential across a discrete resistor coupled in series between the inductive element and the first node of the converter.

14. The current-mode DC/DC converter of claim 11, wherein the circuit is further configured to determine the measure of the output current flowing from the first node of the converter into the external load coupled to the output of the converter by determining a voltage differential across a discrete resistor coupled in series between the first node and the external load.

15. The current-mode DC/DC converter of claim 9, further comprising:
a semiconductor switch coupled between the inductive element and the controller, the controller being configured to adjust the inductor current flowing through the inductive element into the first node of the converter by varying a duty cycle of a signal driving the semiconductor switch.

16. The current-mode DC/DC converter of claim 15, wherein the varying of the duty cycle does not cause the inductor current to exceed a current limiting threshold value.

17. The current-mode DC/DC converter of claim 8, wherein the output current flowing from the first node of the converter into the external load is current-limited.

18. The current-mode DC/DC converter of claim 17, wherein the output current flowing from the first node of the converter into the external load is current-limited by AC coupling the output current flowing from the first node of the converter into the external load coupled to the output of the converter.

19. The current-mode DC/DC converter of claim 8, wherein the converter is a buck current-mode DC/DC converter.

* * * * *